(12) United States Patent
Murg

(10) Patent No.: US 6,687,991 B2
(45) Date of Patent: Feb. 10, 2004

(54) METHOD FOR REMOVING AN OUTER SHEATH OF AN ELECTRICAL CABLE

(75) Inventor: Leonard R. Murg, Eastlake, OH (US)

(73) Assignee: Stride Tool Inc., Ellicottville, NY (US)

( * ) Notice: Subject to any disclaimer, the term of this patent is extended or adjusted under 35 U.S.C. 154(b) by 204 days.

(21) Appl. No.: 09/876,465

(22) Filed: Jun. 7, 2001

(65) Prior Publication Data

US 2002/0004984 A1 Jan. 17, 2002

Related U.S. Application Data

(62) Division of application No. 09/185,493, filed on Nov. 3, 1998.

(51) Int. Cl.[7] .............................................. H01R 43/04
(52) U.S. Cl. .......................... 29/867; 29/234; 29/235; 29/758; 29/825; 29/33 E; 29/33 F
(58) Field of Search .......................... 29/234, 235, 868, 29/33 E, 33 F, 758, 867, 825

(56) References Cited

U.S. PATENT DOCUMENTS

| | | | | |
|---|---|---|---|---|
| 3,871,078 A | * | 3/1975 | Ogle | 30/90.1 |
| 3,947,905 A | * | 4/1976 | Neff | 7/5.6 |
| 4,028,756 A | * | 6/1977 | Couto | 7/5.5 |
| 4,083,105 A | * | 4/1978 | ViPond | 30/90.4 |
| 4,229,849 A | * | 10/1980 | Theiler, Sr. | 7/107 |
| 4,447,949 A | * | 5/1984 | Kane | 30/90.6 |
| 4,607,544 A | * | 8/1986 | Jewell, Jr. | 81/9.4 |
| 4,799,406 A | * | 1/1989 | Diaz-De-Guerenu-Aguirrebeitia | 81/9.4 |
| 4,870,876 A | * | 10/1989 | Rodriquez | 81/426.5 |
| 4,905,373 A | * | 3/1990 | Krampe | 30/90.6 |
| 4,912,847 A | * | 4/1990 | Bradshaw | 30/91.2 |
| D327,826 S | * | 7/1992 | Neff | D8/52 |
| 5,323,502 A | * | 6/1994 | Miller | 7/107 |
| 5,669,132 A | | 9/1997 | Brimmer | 29/426.4 |
| 5,711,182 A | * | 1/1998 | Yang | 72/409.14 |
| 5,724,688 A | * | 3/1998 | Chen | 7/128 |
| 5,826,338 A | * | 10/1998 | Chilton et al. | 30/90.1 |

OTHER PUBLICATIONS

Page 1 of International Search Report dated Nov. 22, 1999.
Ideal Industries, Inc. web site (http://www.idealindustries.com), NM Cable T®–Stripper Wire Stripper, Model No. 45–248; Applicant became aware of product in or about Jul. 1998.
Ideal Industries, Inc. web site (http://www.idealindustries.com), NM Cable T®–Stripper Wire Stipper, Model No. 45–249; Appplicant became aware of product in or about Jul. 1998.

* cited by examiner

*Primary Examiner*—A. Dexter Tugbang
*Assistant Examiner*—Paul D Kim
(74) *Attorney, Agent, or Firm*—Benesch, Friedlander, Coplan & Aronoff LLP (57) ABSTRACT

A process for cutting and removing a portion of an outer sheath having spaced apart insulation covered wires and a core member containing an uncovered ground wire therebetween. The sheath is cut by plier jaw members having cutting edges which define en opening configured to the sheath. On closing the sheath is cut circumferentially without significantly cutting the insulation on the wires or the unsheathed ground wire. The cut portion of the sheath is then removed in one continuous process.

11 Claims, 4 Drawing Sheets

METHOD FOR REMOVING AN OUTER SHEATH OF AN ELECTRICAL CABLE

This application is a divisional of U.S. patent application Ser. No. 09/185,493 filed Nov. 3, 1998.

FIELD OF THE INVENTION

The present invention relates to a method and tool for removing a non-metallic outer sheath from a cable, without damaging the inner wires.

BACKGROUND OF THE INVENTION

Brimmer in U.S. Pat. No. 5,669,132 discloses a stripper tool to remove the outer sheath of an electrical cable having a pair of spaced apart covered electrical wires and an uncovered ground wire therebetween located inside the sheath (hereinafter referred to as "X/2 cable"). That stripper tool, however, is specifically designed to not cut the outer edges of the outer sheath. The user, according to Brimmer, cuts the outer sheath except the outer edge, and then must remove the tool from the cable. The user grasps the sheath, to be removed, and bends the uncut outer portion at least twice to break it. The user then pulls with his fingers the "broken" outer sheath from the cable to expose the electrical and ground wires. The Brimmer tool provides an uncut portion on the sheath because Brimmer maintains the cable elongates itself when the tool cuts the outer sheath. Thus, to avoid cutting the electrical wires Brimmer designed his tool to not cut the cable's outer edge, and inherently the electrical wire.

None of the prior art patents describe a hand-held stripper tool to cut the entire outer sheath of X/2 cable without cutting the electrical or ground wires. None of the prior art patents disclose a hand-held stripper tool wherein the user applies a force to the tool to cut the outer sheath of X/2 cable and then pushes on the tool to remove the cut outer sheath.

SUMMARY OF THE INVENTION

The present invention is a hand-held stripping tool. The tool is adapted for cutting an outer sheath of a first electrical cable. Inside the sheath is parallel spaced apart insulation covered wires and a core member containing an uncovered ground wire between the insulation covered wires. The sheath has spaced apart curved sides conforming to the covered wires. The tool has spaced apart first and second jaw members adapted to be pressed together. The jaw members have cutting edges that receive a portion of the first cable along its length. The cutting edges define an opening configured to cut the sheath without significantly cutting the insulation on the wires or the unsheathed ground wire when the jaw members are pressed together to form the opening. The portion of the sheath is then removed in one continuous process.

DETAILED DESCRIPTION OF THE PRESENT INVENTION

Figure 1:
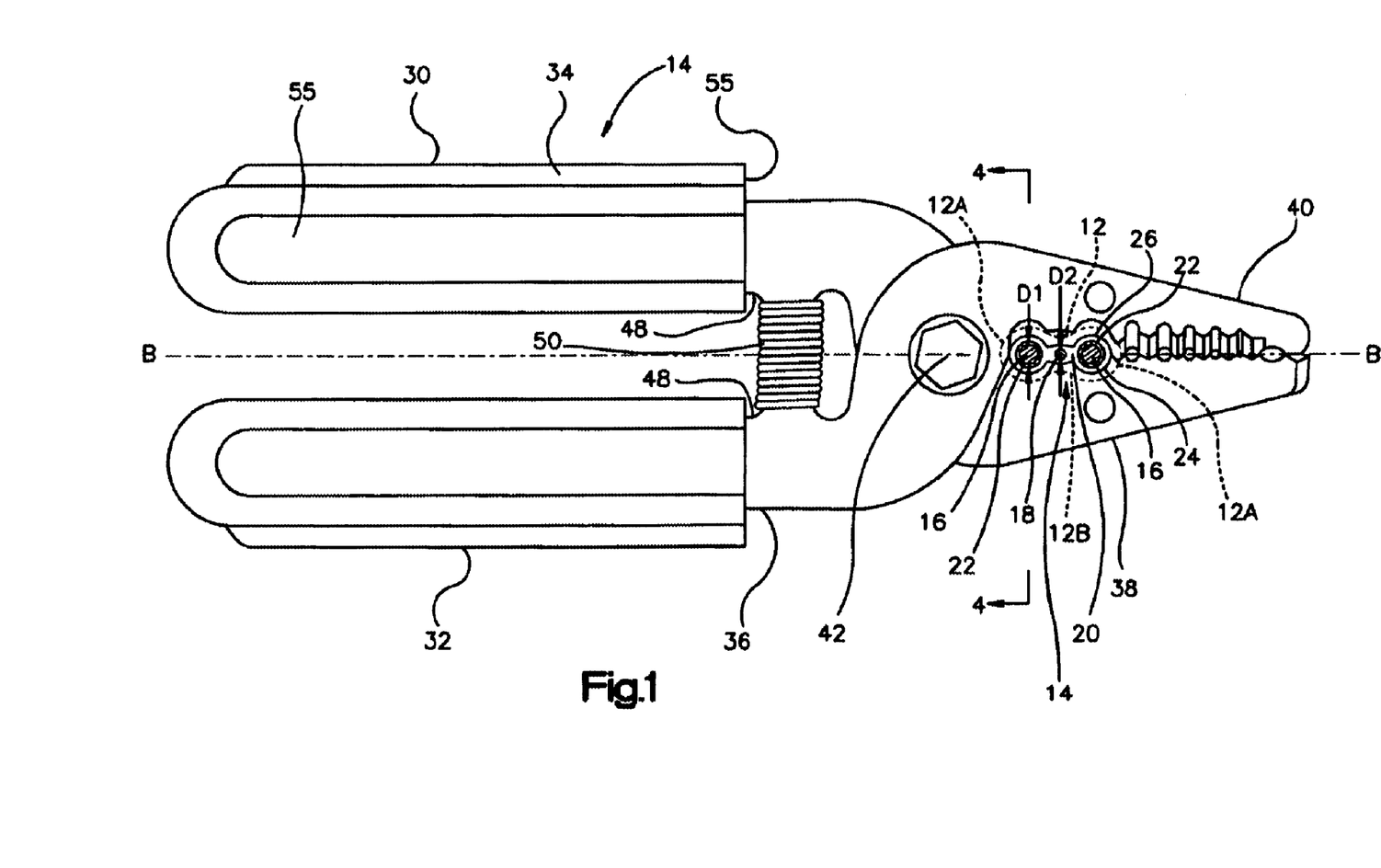
FIG. 1 is a partial view of the first and second jaws specifically showing the cable positioned within the complete cutting opening.

FIG. 1 shows a preferred embodiment of a stripper tool 10. The stripper tool 10 is adapted to cut and remove an outer sheath 12 from a non-metallic sheathed cable 14 in one continuous process. The term "one continuous process" means the user does not release the force applied to the tool 10 until the cut outer sheath 12 is removed from the cable 14. The cable 14 as shown in FIG. 1, has a non-metallic outer sheath 12 that encloses a pair of spaced apart electrical wires 16 and an uncovered ground wire 18 positioned between the electrical wires 16. Packing 20 is also located within the sheath 12 between the wires 16 and 18 and acts to keep the wires 16 and 18 spaced apart.

Each electrical wire 16 has an outer covering 22 to insulate the wires 16 and prevent electrical shorts and accidental electrical shock. Each wire 16 forms an opposed side 12A of the non-metallic sheath 12. Preferably, the electrical wires 16 have a circular cross-section and are pressed against the opposed sides 12A. As such, each opposed side 12A forms an arcuate shape.

In a preferred embodiment, the outer diameter D1 of the outer covering 22 is larger than the outer diameter D2 of the uncovered ground wire 18. Thus, the non-metallic sheath 12 preferably has an essentially rectangular cross-section having a flat middle portion 12B and opposed arcuate sides 12A (FIG. 1). The positioning of the smaller outer diameter ground wire 18 between the larger diameter covered electrical wires 16 allows the flat middle portion 12B to be essentially flat and straight across. The larger diameter of the outer covering 22 elevates the outer sheath 12 wherein the conventional position for the outer sheath 12 is spaced above and below the ground wire 18. However, during cutting, the flat middle portion 12B is pressed inward to contact the ground wire 18 (FIG. 1).

The outer sheath 12 is preferably constructed of a pliable plastic such as PVC that is easily cut by a sharp blade. The outer sheath 12 is preferably 30 mills thick, thereby the knife blades 24C and 26C (to be discussed in detail hereinafter) can easily cut through the outer sheath 12 without damaging the wires 16 and 18. Preferably, the cable 14 is of the type commonly known as ROMEX™ sold by ELECTRICAL SUPPLIES.

Figure 2:
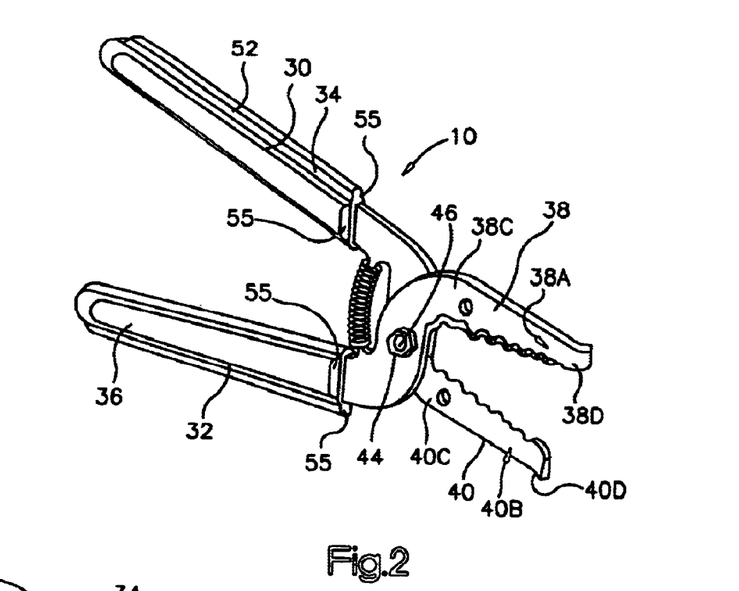
FIG. 2 is a perspective view of the stripper tool of the present invention.

As shown in FIG. 2, the stripper tool 10 has a first member 30 and a second member 32 that attach to each other to form a pair of pliers. The first member 30 and second member 32 provide a first handle 34 and a second handle 36 and a first jaw 38 and a second jaw 40. Preferably, the first member 30 and the second member 32 are identical to enable the members to be interchangeable.

Figure 3:
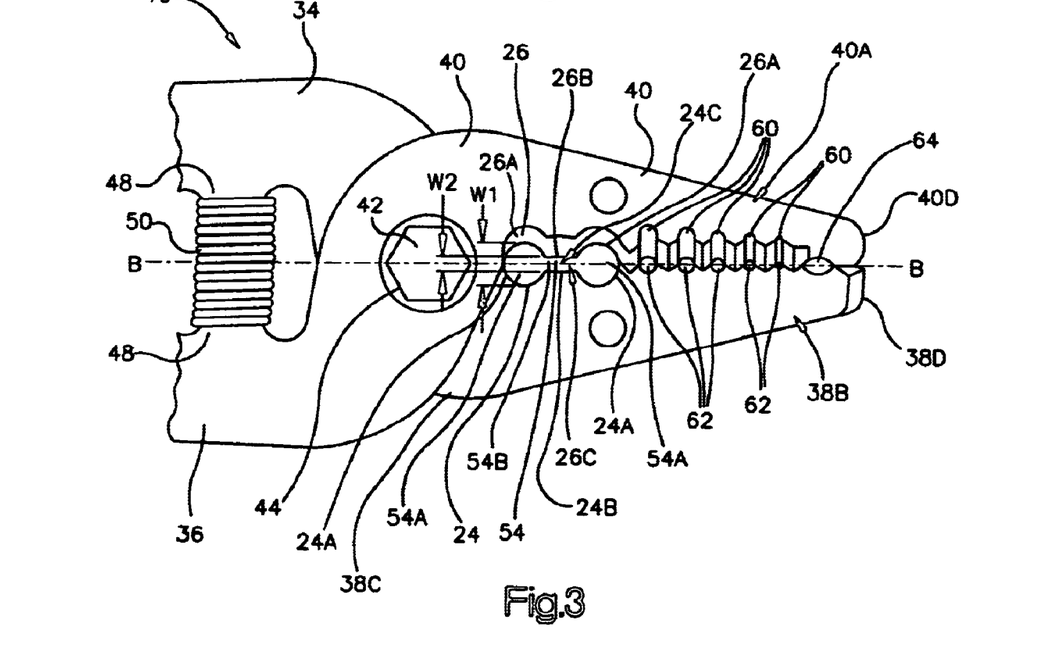
FIG. 3 is a side view of the first and second jaws of the tool showing the cutting edges and the complete cutting opening.

The members 30 and 32 are joined together at a pivot point 42 by a pivot nut 44 and a pivot bolt 46. The pivotal connection enables the members 30 and 32 to pivot about, pivot axis A—A of the tool 10 with respect to each other. The handles 34 and 36 and the jaws 38 and 40 extend outward from the pivot point 42 perpendicular to the pivot axis A—A and parallel to the longitudinal axis B—B of the tool 10 (FIG. 3). The members 30 and 32 are connected in the conventional plier arrangement such that the second handle 36 is spaced above and parallel to the first handle 34 when the first jaw 38 is spaced above and parallel to the second jaw 40 (FIG. 2). It is understood however, that flipping the tool 10 over, reverses the respective positions of the handles 34 and 36 and the jaws 38 and 40. Thus, when the handles 34 and 36 are moved together, the jaws 38 and 40 move together in a corresponding fashion.

The handles 34 and 36 also have nubs 48 adjacent to the pivot point 42 that extend upward perpendicular to the axis B—B. A single coil spring 50 is mounted between the nubs 48 and acts to bias the handles 34 and 36. The jaws 38 and 40, inherently, become spaced apart once the closing pressure on the handles 34 and 36 has been released. In addition, upon complete closing of the handles 34 and 36, the nubs 48 prevent the handles 34 and 36 from being pressed beyond the closed position. The nubs, thus, prevent the first and second members 30 and 32 from bending.

As shown in FIG. 2, the handles 34 and 36 are preferably encased in an insulated, ergonomic outer coating 52. That coating 52 enables the user (not shown) to better grip the tool 10 and protects the user against electrical shock in case the jaws 38 and 40 accidentally cut into a "hot" electrical wire (not shown). The ergonomic attributes are attained by the air gaps 55.

The jaws 38 and 40 have proximal ends 38C and 40C and distal ends 38D and 40D with an outside surface 38A and 40A and an inside surface 38B and 40B, therebetween. The members 30 and 32 are connected together such that the inside surface 38B is adjacent the inside surface 40B. As shown in FIG. 3, in the closed position, the jaws 38 and 40 are preferably angled inward toward the axis B—B so the proximal ends 38C and 40C, adjacent the pivot point 42, are larger than the opposed distal ends 38D and 40D. The angled shape of the jaws 38 and 40 enables the tool 10 to be used in tighter spaces.

The first and second cutting edge 24 and 26 are located in the proximal ends 38C and 40C adjacent the pivot point 42. The cutting edges 24 and 26 have two opposed arcuate ends 24A and 26A with a raised, preferably slightly arcuate alternatively or elongated, middle portion 24B and 26B therebetween. The cutting edges 24 and 26 have an elongated shape extending along the jaws 38 and 40 parallel to the axis B—B. When the jaws 38 and 40 are moved together into the closed position, a complete cutting opening 58 is formed by the first and second cutting edges 24 and 26 (FIG. 3).

The cutting edges 24 and 26 are tapered inward from the outside surface. 38A and 40A toward the inside surface 38B and 40B. The knife blade 24C and 26C is formed on the cutting edges 24 and 26 at the inside surfaces 38B and 40B. The cutting edges 24 and 26 are tapered inward resulting in the knife blade 24C being adjacent and parallel to the knife blade 26C. The knife blades 24C and 26C are sharp enough to easily cut the outer sheath 12. When the jaws 38 and 40 are closed, the two arcuate ends 24A and 26A form opposed arcuate ends 54A and the raised middle portion 24D and 26B form a narrower center portion 54B. The complete cutting opening 54 (54A and 54B) is shaped such that the center portion 54B has a width less than that of the opposed arcuate ends 54A. Preferably, the width W2 of the center portion 54B is only slightly larger than the outer diameter D2 of the ground wire 18. Similarly, the width W1 of the opposed arcuate ends 54A is preferably slightly larger than the outer diameter D1 of the outer covering 22 of the wires 16.

Figure 4:
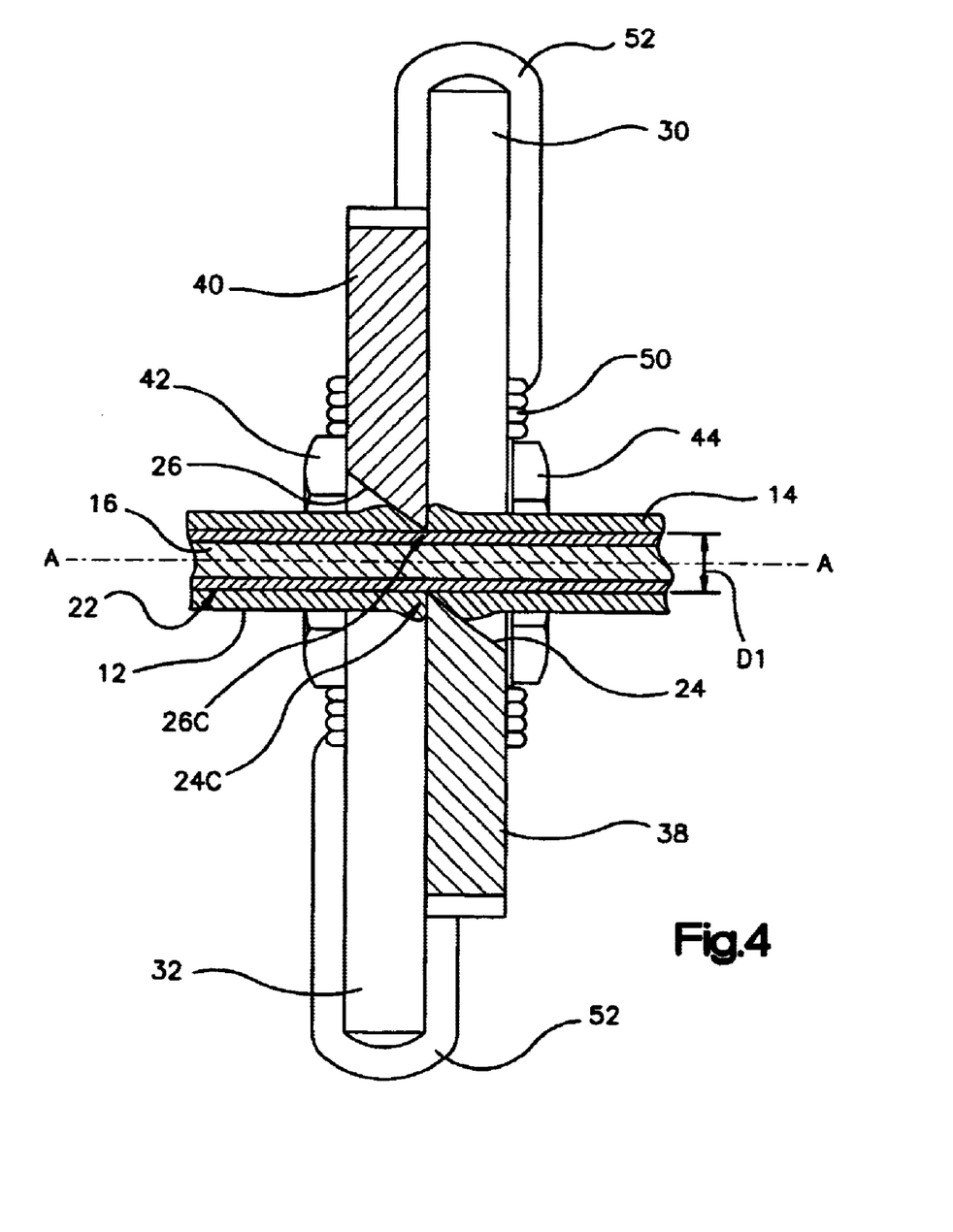
FIG. 4 is a cross-sectional view of FIG. 1 along the line 4—4 showing the knife blades of the cutting edges extending through, the outer sheath.

As shown in FIG. 1, the length of the cutting opening 54 is less than the width of the cable 14 between the opposed sides 12A. Thus, when the jaws 38 and 40 are completely closed, the opening 54 cuts the sheath 12. The shape and width of the opposed ends 54A and center portion 54B are such that when the jaws 38 and 40 are completely closed, the knife blades 24C and 26C sever the outer sheath 12 (FIG. 1). In addition, the widths W1 and W2 in the completely closed position allow the knife blades 24C and 26C to not contact any of the three inner wires 16 and 18 or their respective coverings 22. Thus, the cutting blades 24C and 26C are designed, under proper use, to not extend into the outer covering 22 or into the uncovered ground wire 18 (FIG. 4). Cutting into the outer covering 22 may cause an electrical short in the wires 16 that could lead to an electrical fire or cause electrical failure. Although, there is less cause for alarm if the ground wire 18 is nicked, completely severing the ground wire 18 could cause problems. Preferably, the cutting opening 54 accommodates at least one of the common sized ROMEX™ cable, i.e., 14/2, 12/2 or 10/2.

The jaws 38 and 40 are preferably constructed from metal with the cutting edges 24 and 26 and the knife blades 24C and 26C formed directly into the jaws 38 and 40 by a machining process.

In another preferred embodiment, the jaws 38 and 40 are provided with a plurality of recesses 60 in the distal ends 38D and 40D and spaced apart from the complete cutting opening 54. The recesses 60 are positioned to form a plurality of openings 62 when the first and second jaws 38 and 40 are moved together (FIG. 3). Preferably, the plurality of openings 62 are similar to conventional wire strippers that strip individually covered wires, conventional wire loop holes to twist wire 270°, and screw/bolt cutters. The plurality of recesses 60 allow a variety of sized wires to be stripped, twisted and bolts/screws to be cut.

The distal ends 38D and 40D are curved toward the inside surface 38B and 40B, respectively. The curving of the distal ends 38D and 40D forms a gap 64 between the jaws 38 and 40 (FIG. 3). The gap 64 along with the curved distal ends 38D and 40D enable the tool 10 to be used to twist wires (not shown). The edges of the gap 64 are dull in order to reduce the risk of damaging the wires during twisting. Moreover, the distal ends 38D and 40D also form a conventional plier nose configuration.

Figure 5:
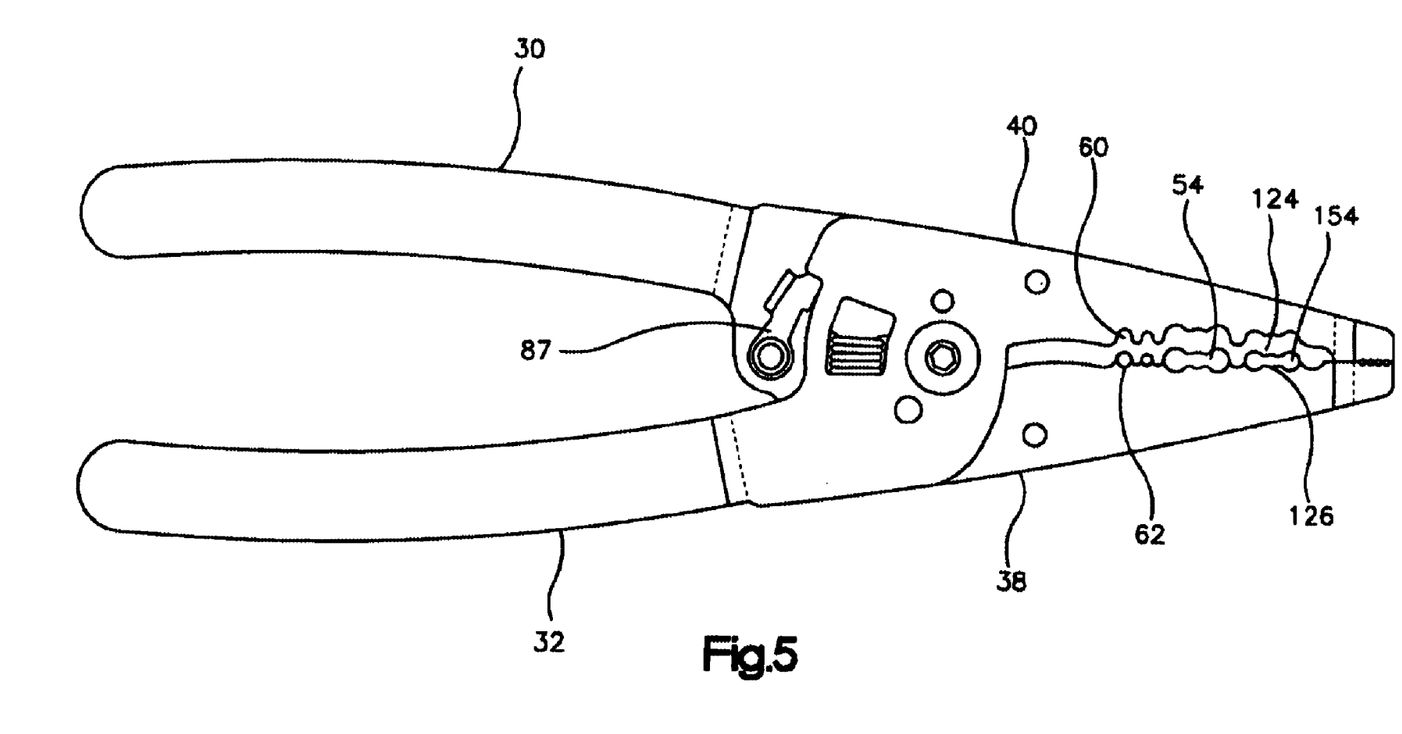
FIG. 5 is an alternative embodiment of FIG. 2.

FIG. 5 shows an alternate embodiment of the tool 10. The alternate embodiment of tool 10 is that it has supplementary cutting edges 124 and 126. The supplementary cutting edges 124 and 126 like the preferred cutting edges 24 and 26, form a supplementary cutting opening 154 when the jaws 38 and 40 are pressed together. The supplementary cutting opening 154 is spaced apart from the first cutting opening 54 toward the distal ends 38D and 40D. Preferably, the supplementary cutting opening 154 is identical to the first complete-cutting opening 54 in shape, but has a different length and width. The supplementary cutting opening 154 allows the tool 10 to be used to strip two different sizes of cable 14.

Moreover, the tool 10 has a locking mechanism 87 to secure the members 30, 32 in-place when tool 10 is not to be used. The semi-circular recesses 60 can also be located on the other side of the opening 54.

In Use

To use the tool 10, the cable 14 is positioned between the cutting edges 24 and 26 so the cable 14 is perpendicular to the axis B—B and the portion of the outer sheath 12 to be stripped extends outward from one side of the jaws 38 and 40. The handles 34 and 36 are then pressed together so the cutting edges 24 and 26 form the complete cutting opening 54 around the cable 14. As such, the opposed ends 54A are then adjacent the opposed sides 12A and the narrower center portion 54B is adjacent the flat middle portion 12B. The handles 34 and 36 are further pressed together until the knife blades 24C and 26C cut into the entire perimeter of the outer sheath 12. Preferably, the force needed to cut the sheath 12 with the stripper tool 10 is easily accomplished by an adult using one hand (not shown). In the completely closed position, the knife blades 24C and 26C only cut through the outer sheath 12 and do not cut into the outer covering 22 or into the uncovered ground wire 18. Once the outer sheath 12 is cut, the user pushes the tool 10 away from the cable 14 to remove the portion of the outer sheath 12. Once the outer sheath 12 is removed, the user can release the pressure on the handles 34 and 36 and then use the plurality of circular recesses 60 to remove the outer covering 22 that are exposed after the outer sheath 12 is removed.

Numerous variations will occur to those skilled in the art. It is intended therefore, that the foregoing descriptions be only illustrative of the present invention and that the present invention be limited only by the hereinafter appended claims.

I claim:

1. A method for removing an outer sheath of an electrical cable, the cable having inside the outer sheath parallel spaced apart insulation covered wires and a core member containing uncovered ground wire between the insulation covered wires wherein the sheath has spaced apart curved sides confirming to the covered wires which comprises:
  a) providing coacting first and second jaw members which are adapted to be pressed together with a portion of the cable along a length of the cable positioned between the jaw members, wherein the first and second jaw members are provided with cutting edges defining an opening configured to cut the sheath without significantly cutting an insulation covering of the insulation covered wires or the uncovered ground wire when the first and second jaw members are pressed together to form the opening, each of the cutting edges of the first and second jaw members including a middle cutting part between spaced apart first and second end cutting parts of the cutting edge for cutting a central portion of the outer sheath surrounding the core member containing the uncovered ground wire, the middle cutting part being arcuate with end portions curving toward a longitudinal axis defined by the first and second jaw members when pressed together; and
  b) inserting the cable between the cutting edges such that the jaw members are adjacent the portion of the cable along the length of the cable spaced apart from the end of the cable from which the outer sheath is to be removed; and
  c) pressing the first jaw member and the second jaw member together such that the cutting edges completely cut the outer sheath of the electrical cable and thereby separate an end portion of the sheath from the remainder of the sheath.

2. The method of claim 1, further comprising the steps of pushing the first and second jaw members away from the cable while restraining the cable to remove the end portion of the outer sheath from the cable to expose the insulation covered wires and the uncovered ground wire within the cable in one continuous process.

3. The method of claim 1, wherein supplementary cutting edges are provided on the first jaw member and the second jaw member spaced apart from the cutting edges to form a supplementary opening spaced apart from the opening along the longitudinal axis of the jaw members which is used to remove the outer sheath from a cable having a different circumferential extent.

4. The method according to claim 1, wherein the first and second jaw members have at least one wire tool selected from the group consisting of a wire stripper for a single wire, a wire loop hole, a bolt/screw cutter, and at the distal ends of the first and second jaw members a plier nose configuration.

5. A method of stripping insulation from a cable of a type having a spaced pair of conductor wires, a ground wire disposed between the conductor wires, insulation surrounding each of the conductor wires and an outer covering, the method comprising:
  a) closing coacting first and second jaws of a plier type cutter tool around the cable to circumferentially sever the outer covering thereby producing a severed end covering portion, the jaws each including a cutting edge, when the jaws are closed, the cutting edges of the jaws defining an opening configured to cut the outer covering without significantly cutting the insulation surrounding each of the conductor wires and the ground wire disposed between the conductor wires, each of the cutting edges of the jaws including a middle cutting part between spaced apart first and second end cutting parts of the cutting edge for cutting a central portion of the outer covering surrounding the ground wire, the middle cutting part being arcuate with end portions curving toward a longitudinal axis of the plier type cutter tool; and
  b) relatively moving the jaws and the severed end covering portion longitudinally of the cable to strip the severed covering portion and thereby leave exposed end portion of each of the conductor wires including the insulation around the conductor wires.

6. The process of claim 5 wherein the first and second end cutting parts of the cutting edges of the respective jaws each are arcuately curved such that, when step (a) is completed, the first end cutting parts of the first and second jaws closely surround one of the pair of conductor wires and the second end cutting parts of the first and second jaws closely surround the other of the pair of conductor wires.

7. A process of performing a stripping step in the preparation of an electrical cable for use, the cable including a spaced pair of conductor wires, a ground wire disposed between the conductor wires, insulation surrounding each of the conductor wires and an outer sheath, the steps of the process comprising:
  a) closing coacting first and second jaws of a plier type tool equipped with a sheath severing cutter section configured to cut the outer sheath without significantly cutting the insulation surrounding each of the conductor wires and the ground wire disposed between the conductor wires, the sheath severing cutter section including a cutting edge formed in each of the first and second jaws, each cutting edge including a middle cutting part between spaced apart first and second end cutting parts of the cutting edge for cutting a central portion of the outer sheath surrounding the ground wire, the middle cutting part being arcuate with end portions curving toward a longitudinal axis of the plier type tool;
  b) continuing the closing until the sheath is circumferentially severed by the sheath severing cutter section to separate an end portion of the sheath from a balance of the sheath; and,
  c) relatively moving the tool and the cable longitudinally of the cable shift the tool away from the balance of the sheath and thereby strip the end portion from the cable.

8. The process of claim 7 further including stripping end portions of the insulation from the conductor wires.

9. The process of claim 7 further including the step of stripping a sheath and portion of another cable of a size different than the first mentioned cable initializing a second sheath severing cutter section.

10. A method of stripping insulation from a cable of a type having a spaced pair of conductor wires, a ground wire disposed between the conductor wires, insulation surrounding each of the conductor wires and an outer covering, the method comprising:

a) closing coacting first and second jaws of a plier type cutter tool around the cable to circumferentially sever the outer covering thereby producing a severed end covering portion, the jaws each including a cutting edge, when the jaws are closed, the cutting edges of the jaws defining an opening configured to cut the outer covering without significantly cutting the insulation surrounding each of the conductor wires and the ground wire disposed between the conductor wires, each of the cutting edges of the jaws including a raised middle cutting part between spaced apart first and second end cutting parts of the cutting edge for cutting a central portion of the outer covering surrounding the ground wire, and b) relatively moving the jaws and the severed end covering portion longitudinally of the cable to strip the severed covering portion and thereby leave exposed end portion of each of the conductor wires including the insulation around the conductor wires.

11. The method of claim 10, wherein the raised middle cutting part is arcuate with end portions curving toward a longitudinal axis of the tool.

\* \* \* \* \*

UNITED STATES PATENT AND TRADEMARK OFFICE
CERTIFICATE OF CORRECTION

PATENT NO.    : 6,687,991 B2
DATED         : February 10, 2004
INVENTOR(S)   : Murg, Leonard R.

It is certified that error appears in the above-identified patent and that said Letters Patent is hereby corrected as shown below:

Column 3,
Line 49, replace "portion" with -- parts --
Line 49, replace "24D" with -- 24B --
After line 57, and before line 58, insert the following new paragraph -- Each cutting edge is shaped such that there are two end teeth respectively adjacent the end cutter parts 24A and 26A. The cutting edge is also shaped such that there are two central teeth respectively defined at the junctures the end cutter parts and the middle cutter parts 24B and 26B. --
Line 67, replace "24C" and "26C" with -- 24 and 26 of the disclosed embodiment --

Column 4,
Lines 3 and 13, replace "blades" with -- edges --
Line 66, before "preferably", insert -- Expressed another way, the sheath is circumferentially severed. --

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,687,991 B2
DATED : February 10, 2004
INVENTOR(S) : Murg, Leonard R.

It is certified that error appears in the above-identified patent and that said Letters Patent is hereby corrected as shown below:

Column 2,
Line 40, replace "24C and 26C" with -- 24 and 26 --
Line 45, after "first", insert -- lever --
Line 46, after "second", insert -- lever --
Line 52, replace "are" with -- have boss portions --
Line 54, replace "members" with -- levers --
Line 54, delete ","
Line 59, replace "members" with -- levers --
Line 66, after "together,", insert -- from an open position to a closed position --

Column 3,
Line 29, replace "cutting edge" with -- knife blades --
Line 29, replace "in" with -- adjacent --
Line 30, replace "adjacent" with -- near --
Line 31, replace "cutting edges" with -- knife blades --
Line 31, replace "ends" with -- end cutting parts --
Line 33, delete "or"
Line 33, after "alternatively elongated", insert -- central or --
Line 33, replace "portion" with -- parts --
Line 34, replace "cutting edges" with -- knife blades --
Line 37, after "a complete cutting", insert -- or wire receiving --
Line 38, replace "first and second cutting edges" with -- knife blades --
Line 39, after "3)", insert -- wherein the wire receiving opening is smaller than the sheath of a cable to be stripped --
Line 40, replace "cutting edges" with -- knife blades --
Line 41, (in both instances) replace "surface" with -- surfaces --
Line 42, replace "knife blade" with -- cutting edges --
Line 42, replace "is" with -- are --
Line 43, replace "cutting edges" with -- knife blades --
Line 44, replace "cutting edges" with -- knife blades --
Line 44, replace "inward" with -- inwardly --
Line 45, replace "knife blade" with -- cutting edge --
Lines 45-46, replace "knife blade" with -- cutting edge --
Line 46, replace "knife blades" with -- cutting edges --
Line 47, replace "12" with -- 52 --
Line 48, replace "ends" with -- end cutting parts --

UNITED STATES PATENT AND TRADEMARK OFFICE
CERTIFICATE OF CORRECTION

PATENT NO. : 6,687,991 B2
DATED : February 10, 2004
INVENTOR(S) : Murg, Leonard R.

It is certified that error appears in the above-identified patent and that said Letters Patent is hereby corrected as shown below:

Column 3 cont'd.,
Line 49, replace "portion" with -- parts --
Line 49, replace "24D" with -- 24B --
After line 57, and before line 58, insert the following new paragraph -- Each cutting edge is shaped such that there are two end teeth respectively adjacent the end cutter parts 24A and 26A. The cutting edge is also shaped such that there are two central teeth respectively defined at the junctures the end cutter parts and the middle cutter parts 24B and 26B. --
Line 67, replace "24C and 26C" with -- 24 and 26 of the disclosed embodiment --

Column 4,
Line 3, replace "blades" with -- edges --
Line 13, replace "blades" with -- edges --
Line 66, before "preferably", insert -- Expressed another way, the sheath is circumferentially severed. --

Signed and Sealed this

Twenty-eighth Day of September, 2004

JON W. DUDAS
*Director of the United States Patent and Trademark Office*